(12) United States Patent
Spaeth (10) Patent No.: US 7,209,575 B2
(45) Date of Patent: Apr. 24, 2007

(54) METHOD FOR VISUAL INSPECTION OF PRINTED MATTER ON MOVING LIDS

(75) Inventor: Scott Spaeth, Richmond, IN (US)

(73) Assignee: Berry Plastics Corporation, Evansville, IN (US)

( * ) Notice: Subject to any disclaimer, the term of this patent is extended or adjusted under 35 U.S.C. 154(b) by 178 days.

(21) Appl. No.: 10/936,355

(22) Filed: Sep. 8, 2004

(65) Prior Publication Data

US 2006/0050949 A1   Mar. 9, 2006

(51) Int. Cl.
*G06K 9/00* (2006.01)

(52) U.S. Cl. ............... 382/103; 382/141; 382/143; 356/239.4; 356/240.1; 348/86

(58) Field of Classification Search ......... 382/103, 382/141, 142, 143, 149, 140, 145, 147; 348/86; 248/125; 356/239.4, 240.1, 239.6
See application file for complete search history.

(56) References Cited

U.S. PATENT DOCUMENTS

| | | | |
|---|---|---|---|
| 4,915,230 A * | 4/1990 | Mancini ............... 206/459.5 |
| 5,095,204 A | 3/1992 | Novini | |
| 5,126,556 A * | 6/1992 | Domenico et al. ....... 250/223 B |
| 5,132,791 A | 7/1992 | Wertz | |
| 5,331,118 A * | 7/1994 | Jensen ................. 177/25.14 |
| 5,369,713 A * | 11/1994 | Schwartz et al. ........ 382/142 |
| 5,515,159 A * | 5/1996 | Sites et al. ............. 356/237.1 |
| 5,592,286 A | 1/1997 | Fedor | |
| 5,699,152 A | 12/1997 | Fedor | |
| 5,805,279 A | 9/1998 | Palombo | |
| 5,861,613 A * | 1/1999 | Apelberg et al. ........ 235/454 |
| 6,103,287 A * | 8/2000 | Soehnlen et al. ........ 436/393 |
| 6,432,253 B1 * | 8/2002 | Chung ................. 156/295 |
| 6,473,169 B1 * | 10/2002 | Dawley et al. ......... 356/239.4 |
| 6,506,991 B1 * | 1/2003 | Eixelberger et al. ...... 209/581 |
| 6,527,181 B1 * | 3/2003 | Kleeberg et al. ....... 235/462.03 |
| 6,616,189 B2 * | 9/2003 | Raming ................ 283/81 |
| 6,621,269 B2 * | 9/2003 | Ward et al. ............ 324/388 |
| 6,845,914 B2 * | 1/2005 | Bian et al. ............ 235/262.16 |

FOREIGN PATENT DOCUMENTS

| | | |
|---|---|---|
| EP | 0 472 881 A2 | 3/1992 |
| EP | 0 477 536 A2 | 4/1992 |
| WO | WO 96/31768 | 3/1992 |
| WO | WO 96/27782 | 9/1996 |

OTHER PUBLICATIONS

"Machinery With a Vision," Packaging World, Oct. 2003 (7 pages).

\* cited by examiner

*Primary Examiner*—Yosef Kassa
(74) *Attorney, Agent, or Firm*—Barnes & Thornburg LLP (57) ABSTRACT

A method for visual inspection of printed matter on moving lids is disclosed. An associated visual inspection system is also disclosed.

30 Claims, 8 Drawing Sheets

METHOD FOR VISUAL INSPECTION OF PRINTED MATTER ON MOVING LIDS

BACKGROUND

The present disclosure relates to visual inspection of moving articles.

SUMMARY

According to the present disclosure, a method for visual inspection of printed matter on moving lids is disclosed. The method includes sensing an image of a lid positioned on and being moved by a conveyor, generating an image signal representative of the image in response to sensing the image, and evaluating the image signal to determine whether printed matter on the lid complies with predetermined criteria. Illustratively, this method is applied to two lanes of lids on the conveyor and to a single lane of lids on the conveyor. Associated dual-lane and single-lane visual inspection systems are also disclosed.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which.

DETAILED DESCRIPTION

Figure 1:
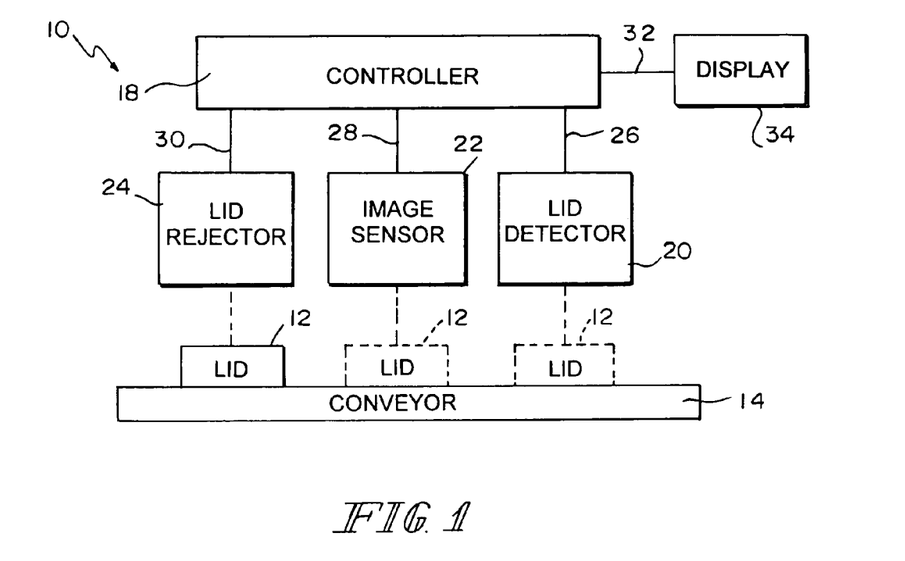
FIG. 1 is a diagrammatic view showing a visual inspection system for inspecting printed matter on moving lids.
Figure 2:
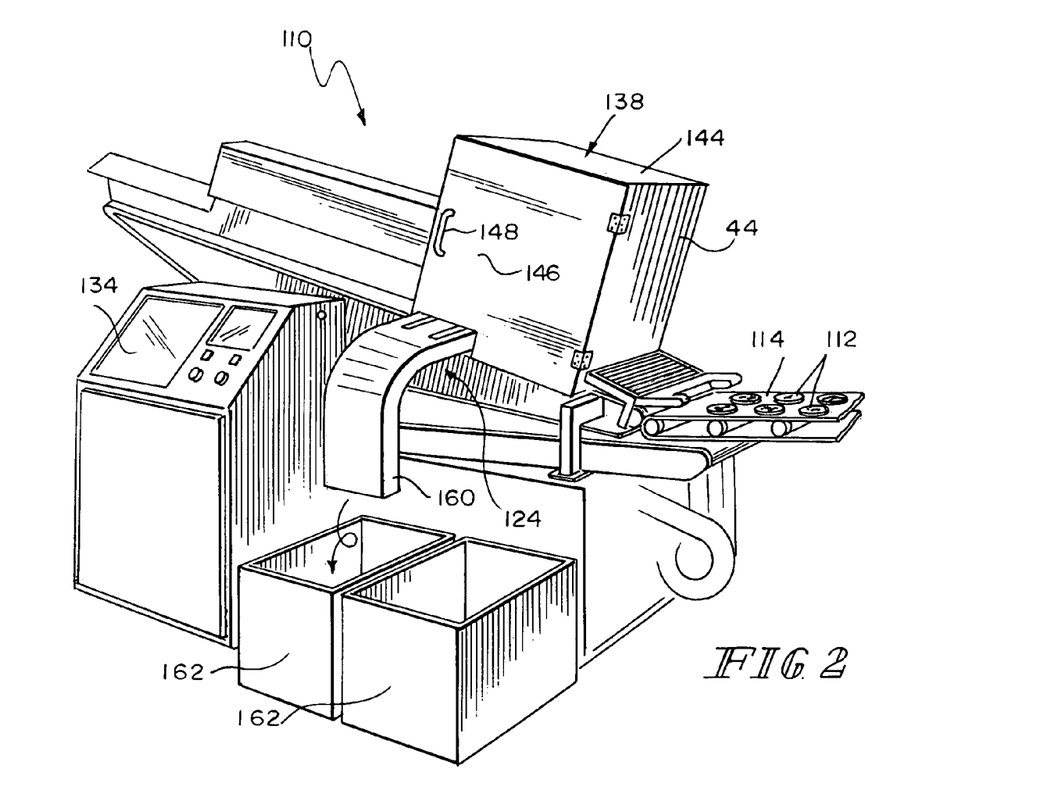
FIG. 2 is a perspective view of a dual-lane visual inspection system for inspecting printed matter on lids arranged in two lanes on a conveyor.

A visual inspection system 10 is used for visual inspection of printed matter on lids 12 positioned on and being moved by a conveyor 14, as shown diagrammatically, for example, in FIG. 1. System 10 senses an image of each lid 12, evaluates whether the printed matter on lid 12 complies with predetermined criteria, and rejects lid 12 if the printed matter does not comply with the predetermined criteria.

System 10 includes a controller 18, a lid detector 20, an image sensor 22, a lid rejector 24, and a display 34. As conveyor 14 moves lid 12 past lid detector 20, lid detector 20 detects lid 12 and generates a lid-detection signal on electrical line 26 in response to detecting lid 12.

In response to receipt of the lid-detection signal, controller 18 generates a sense-image signal on an electrical line 28 to cause image sensor 22 to sense an image of lid 12. Image sensor 22 senses an image of lid 12 and, in response to sensing the image, generates on line 28 an image signal representative of the sensed image. Following instructions stored in controller 18, controller 18 evaluates the image signal to determine whether the printed matter on lid 12 complies with the predetermined criteria.

If the printed matter does not comply with the predetermined criteria, controller 18 generates a lid-rejection signal on an electrical line 30 to cause lid rejector 24 to reject lid 12. In rejecting lid 12, lid rejector 24 removes lid 12 from conveyor 14 and verifies whether lid 12 has been removed from conveyor 14. In response to receipt of a display signal from controller 18 over an electrical line 32, display 34 displays information about the sensed images.

A dual-lane visual inspection system 110 shown, for example, in FIGS. 2–5, is an example of visual inspection system 10. System 110 is configured to inspect printed matter 36 on lids 12 which are arranged in two parallel lanes on a conveyor 114.

Figure 3:
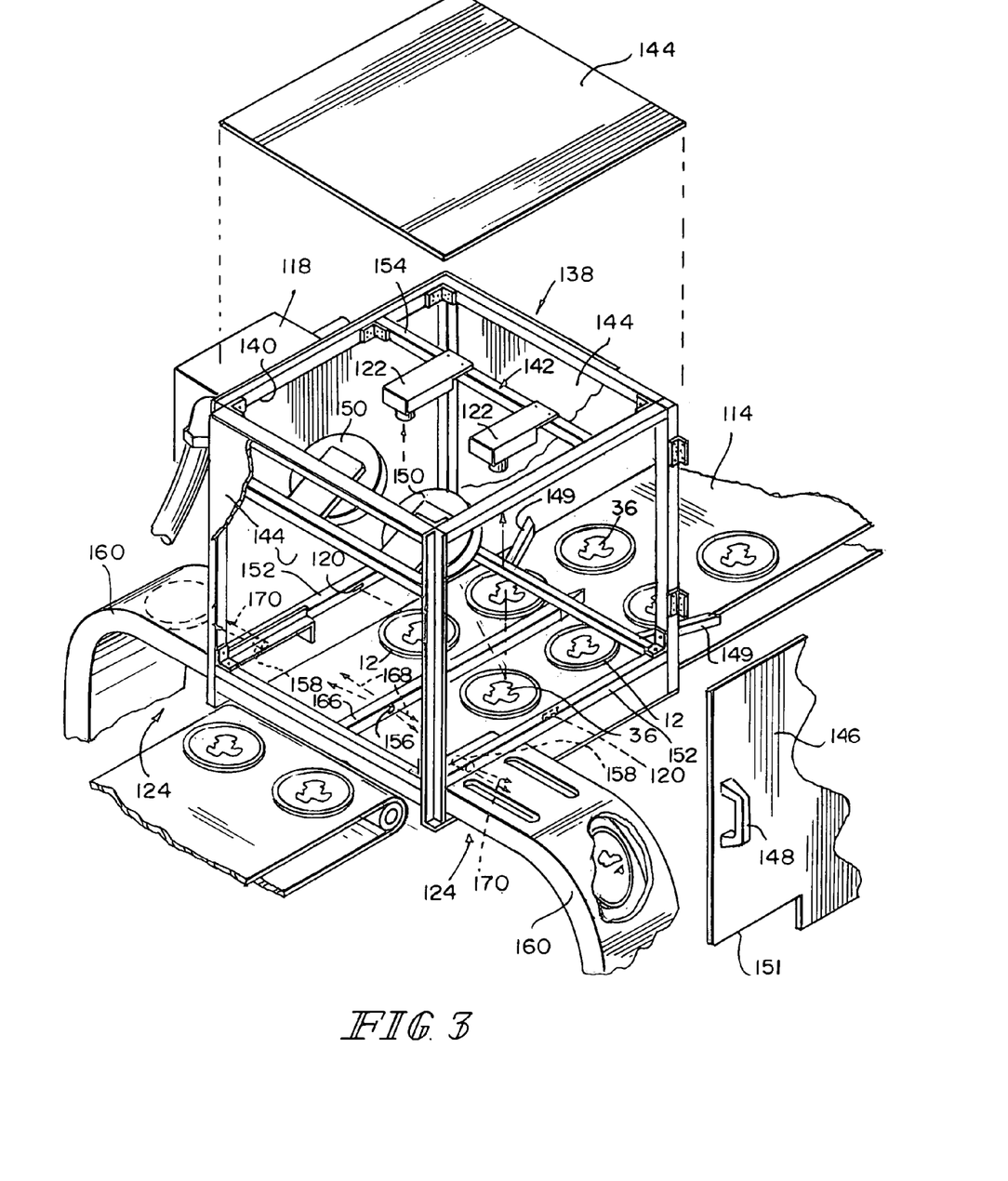
FIG. 3 is a perspective view of the dual-lane visual inspection system, with portions broken away, showing a pair of image sensors arranged to sense images of the lids for evaluation of the printed matter on the lids to determine whether the printed matter complies with predetermined criteria and showing rejection of defective lids.
Figure 4:
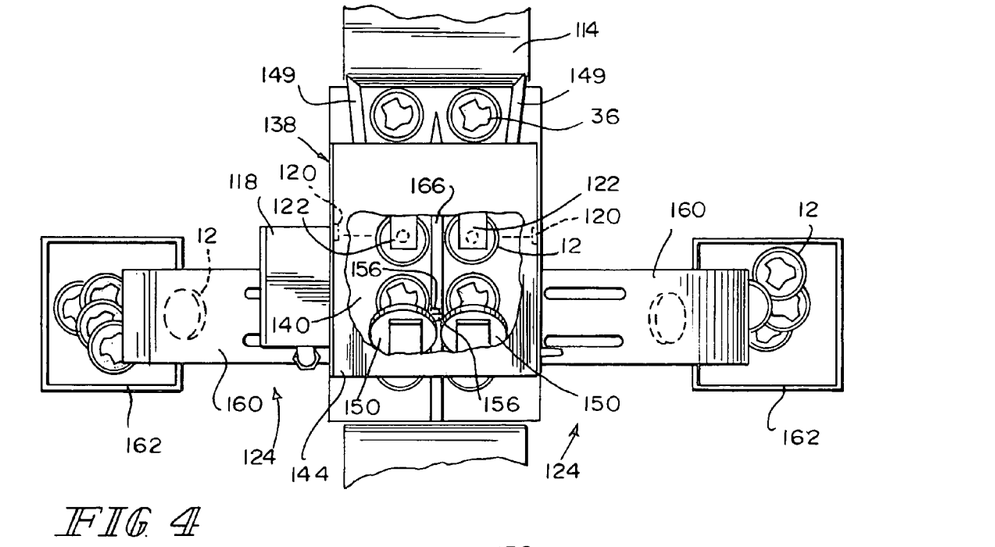
FIG. 4 is a top plan view, with portions broken away, of the dual-lane visual inspection system.
Figure 5:
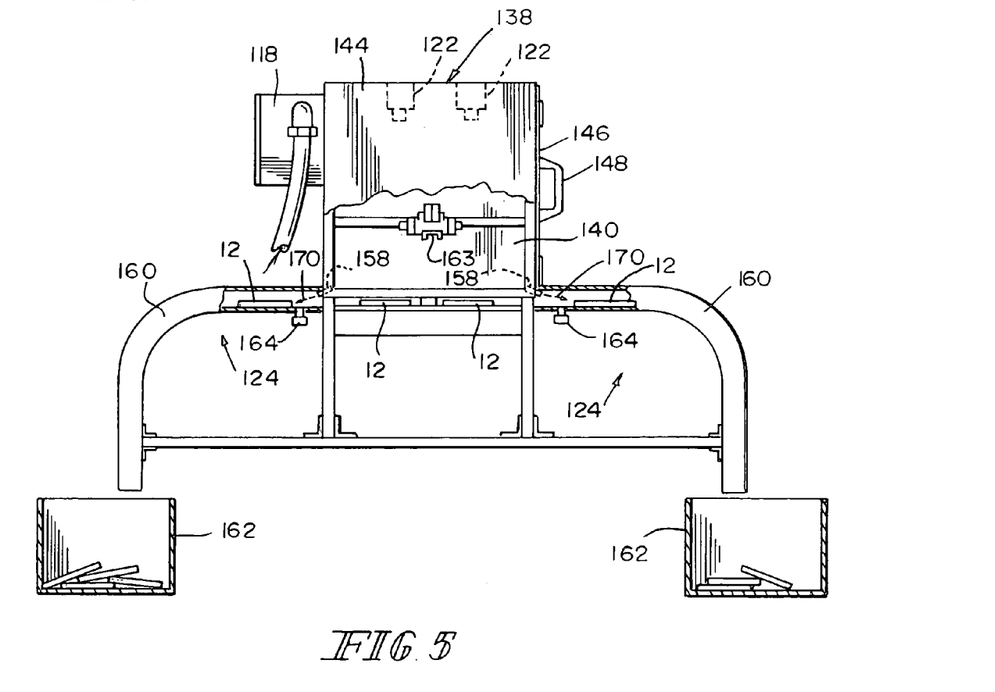
FIG. 5 is a front elevational view, with portions broken away, of the dual-lane visual inspection system.

System 110 includes an enclosure 138 formed to include an interior inspection region 140, as shown, for example, in FIGS. 3–5. Conveyor 114 moves the two lanes of lids 12 through interior inspection region 140 for inspection of lids 12 by system 110. Enclosure 138 includes a frame 142, a plurality of panels 144 coupled to frame 142, and an access door 146 hinged to frame 142 to allow external access to interior inspection region 140. A handle 148 coupled to door 146 is configured to be used by a person to open and close door 146. A notch 151 is formed in door 146 to receive a chute 160 when door 146 is closed.

System 110 includes a pair of lid positioners 149, a pair of light sources 150, a pair of lid detectors 120, a pair of image sensors 122, a pair of lid rejectors 124, and a common controller 118, as shown, for example, in FIG. 3. Each lid positioner 149, light source 150, lid detector 120, image sensor 122, and lid rejector 124 is associated with one of the two lanes of lids 12. Controller 118 is coupled to each lid detector 120, each image sensor 122, and each lid rejector 124 to control inspection of lids 12 in both lanes so that the inspection process of lids 12 in one lane is independent of the inspection process of lids 12 in the other lane.

Each lid positioner 149 is arranged to position the lids 12 of the associated lane in a predetermined position on conveyor 114 in response to movement of conveyor 114 so that lids 12 will enter the field of view of image sensor 122 for inspection by system 110 upon entry into region 140, as shown, for example, in FIGS. 3 and 4. Illustratively, lid positioner 149 is configured as a bar coupled to frame 142 and arranged to move laterally inwardly those lids 12 which are positioned on conveyor 114 too far laterally outwardly upon movement of conveyor 114.

Each light source 150 is coupled to frame 142 and positioned in region 140, as shown, for example, in FIG. 3. Light source 150 is arranged to illuminate each lid 12 in the associated lane and, illustratively, is configured as a ring light. It is within the scope of this disclosure to use a variety of lighting arrangements for illuminating each lid 12.

Each lid detector 120 is arranged to detect the presence of each lid 12 in the associated lane, as shown, for example, in FIGS. 3 and 4. Lid detector 120 generates a lid-detection signal and sends that signal to a controller 18 each time it detects a lid 12. Illustratively, lid detector 120 is a photosensor coupled to a lower side rail 152 of frame 142.

Each image sensor 122 is arranged to sense an image of each lid 12 in the associated lane, as shown, for example, in FIG. 3. Controller 118 sends a sense-image signal to image sensor 122 to cause sensor 122 to sense an image of a lid 12 in response to receipt of a lid-detection signal. Image sensor 122 generates an image signal representative of the image sensed and sends the image signal to controller 118 in response to sensing the image. Illustratively, image sensor 122 is a camera coupled to a top rail 154 of frame 142.

Controller 118 evaluates each image signal to determine whether printed matter 36 complies with predetermined criteria. The evaluation process is discussed in more detail below. If printed matter 36 does not comply with the predetermined criteria, controller 118 generates a lid-rejection signal to cause a lid rejector 124 to reject the lid 12 with the non-compliant printed matter 36.

Each lid rejector 124 is arranged to remove the lid 12 with the non-compliant printed matter 36 from conveyor 114 and to verify whether that lid 12 has been removed from conveyor 114, as shown, for example, in FIGS. 3–5. Lid rejector 124 includes, for example, a first air nozzle 156, a second air nozzle 158, a chute 160, a collection bin 162, a valve assembly 163, and a lid detector 164. First air nozzle 156 is coupled to a lane divider 166 of frame 142 and arranged to direct a first pulse 168 of air laterally outwardly at lid 12 to cause lid 12 to move off conveyor 114 and into chute 160. Second air nozzle 158 is coupled to chute 160 and arranged to direct a second pulse 170 of air at lid 12 to move lid 12 through chute 160 into collection bin 162. Valve assembly 163 is coupled to frame 142 and controller 118 to control discharge of air pulses from air nozzles 156, 158 and includes, for example, four solenoid valves, one for each nozzle 156, 158.

Lid detector 164 is coupled to chute 160 to detect each lid 12 that passes through chute 160. Detector 164 sends a verification signal to controller 118 when it detects a lid 12 to inform controller 118 that lid 12 has been removed from conveyor 114. Illustratively, detector 164 is a photosensor.

Controller 118 performs four tests in connection with each image. The four tests performed are (1) a lid location test (which may be referred to, for example, as a "lid locate test"), (2) a color content test (which may be referred to, for example, as a "graphics inspection test"), (3) a print location test (which may be referred to as an "off-center test"), and (4) a lid orientation test. Each test is discussed in turn.

With respect to the lid location test, controller 118 first determines whether the entire lid 12 is present within the image sensed by image sensor 122—i.e., within the "field of view" of sensor 122. The entire lid 12 needs to be present within the field of view of sensor 122 for the results of the other three tests to be valid. If lid 12 is outside the field of view, controller 118 generates a lid-rejection signal and lid rejector 124 removes lid 12 from conveyor 114.

Figure 6:
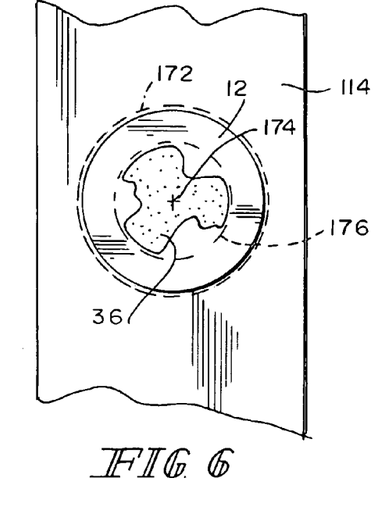
FIG. 6 is a top plan view of a lid showing evaluation of the color content of the printed matter on the lid within an area defined by an imaginary outer circle and showing evaluation of whether the printed matter is concentric with the lid by use of an imaginary inner circle.

In the color content test, controller 118 determines whether the color content of printed matter 36 of a lid 12 complies with predetermined color criteria, as shown, for example, in FIG. 6. If printed matter 36 does not comply with the predetermined color criteria, controller 118 generates a lid-rejection signal and lid rejector 124 removes lid 12 from conveyor 114 in response to the lid-rejection signal.

To determine whether the color content complies with the predetermined color criteria, controller 118 establishes a "pixel count" area on the image to evaluate the color content of the pixels in the pixel count area. This area is defined by an imaginary outer linear boundary 172 set to match the shape of the perimeter of the image of the lid 12 being evaluated. Illustratively, boundary 172 is circular.

Once the pixel count area is established, controller 118 counts the number of pixels of each color of a predetermined set of colors located in the pixel count area. Controller 118 then determines whether the number of pixels of each color of the predetermined set of colors complies with predetermined individual color criteria specific to that color. Lid 12 is rejected if the number of pixels of any color does not comply with the predetermined individual color criteria for that color.

Controller 118 employs a "dynamic tolerancing" procedure to establish the individual color criteria for each color. Controller 118 initially uses the color content of the first lid 12 that passes through system 110 after controller 118 receives a commence-inspection signal as a baseline to evaluate the color content of the images of the next few lids 12 that pass through system 110. The individual color criteria for each color of this initial group of lids 12 is the baseline for that color plus or minus a tolerance.

After a predetermined number (e.g., 25) of lids 12 has passed through system 110, controller 118 determines the individual color criteria for each color of each succeeding lid 12 based on the color content of the printed matter 36 of a predetermined number (e.g., 25) of lids 12 preceding the lid 12 being evaluated. Controller 118 averages the number of pixels of each color of the predetermined set of colors over the predetermined number of lids 12 evaluated before the current lid 12 being evaluated. This average is calculated for each color of each lid 12 evaluated after the initial group of lids 12 and, in conjunction with a tolerance (or "error tolerance percentage"), becomes the predetermined individual color criteria for that color of that lid 12. The predetermined individual color criteria is thus allowed to change or "float" after the initial group of lids 12 to accommodate real-time variations in the process of applying printed matter 36 to lids 12.

Controller 118 uses the individual color criteria to evaluate each color of each lid 12. For each color, controller 118 determines the percentage that the color deviates from the baseline (for the initial group of lids 12) or the average (for lids 12 after the initial group) and evaluates whether this deviation percentage (or "graphics error percentage") falls within the error tolerance percentage for that color. If it does fall within the error tolerance percentage, that particular color passes the color content test. If it does not fall within the error tolerance percentage, the color does not pass the color content test and lid 12 is rejected.

Figure 7:
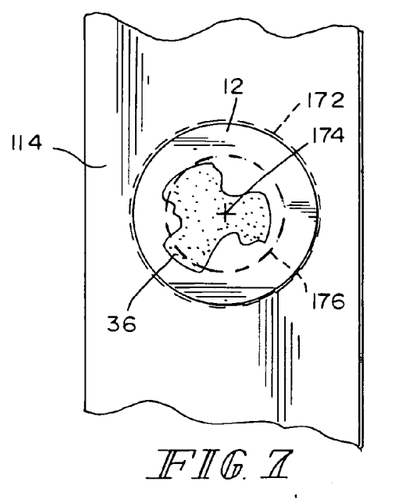
FIG. 7 is a top plan view of a lid showing printed matter that is off-center from the center of the lid.

During the print location test, controller 118 determines whether printed matter 36 is located in a predetermined location relative to the center 174 of lid 12, as shown, for example, in FIGS. 6 and 7. Illustratively, the predetermined location is the location of printed matter 36 when it is concentric with center 174, as shown, for example, in FIG. 6. If printed matter 36 is not located in the predetermined location, as shown, for example, in FIG. 7, controller 118 generates a lid-rejection signal and lid rejector 124 removes lid 12 from conveyor 114 in response to the lid-rejection signal.

To determine whether printed matter 36 is located in the predetermined location, controller 118 establishes an imaginary inner linear boundary 176 and determines whether the pixels located on boundary 176 comply with predetermined location criteria. Illustratively, boundary 176 is circular. Controller 118 categorizes each pixel located on boundary 176 as either a "printed matter" pixel when the pixel represents printed matter 36 or a "non-printed matter" pixel when the pixel does not represent printed matter 36. Controller 118 calculates the percentage of printed matter pixels relative to the total number of pixels on boundary 176 and compares that percentage to a threshold. If the percentage exceeds the threshold, lid 12 is rejected.

Controller 118 employs the lid orientation test to determine whether printed matter 36 is located on a predetermined surface 178 of lid 12, as shown, for example, in FIGS. 8–11. If lid 12 is in the predetermined orientation, as shown, for example, in FIGS. 8 and 9, controller 118 determines that printed matter 36 is located on predetermined surface 178. If, on the other hand, lid 12 is not in the predetermined orientation, as shown, for example, in FIGS. 10 and 11, controller 118 determines that printed matter 36 is not located on predetermined surface 178. Controller 118 generates a lid-rejection signal and lid rejector 124 removes lid from conveyor 114 in response to the lid-rejection signal when lid 12 is determined not to be in the predetermined orientation.

During the lid orientation test, controller 118 determines whether a region 179 (e.g., a shadow) of the image having a predetermined size and a predetermined contrast level relative to the lid is present in a predetermined area 180 of the image due to rim 182. Controller 118 categorizes each pixel in area 180 as either a "white" pixel or a "black" pixel by comparing the brightness level of the pixel with the brightness level of the background color of lid 12. If the difference between the brightness level of the pixel and the brightness level of the lid background color does not exceed a predetermined contrast level threshold, the pixel is categorized as a white pixel. If the difference between the brightness level of the pixel and the brightness level of the lid background color does exceed the predetermined contrast level threshold, the pixel is categorized as a black pixel. If the number of black pixels in area 180 does not exceed a predetermined black pixel threshold, controller 118 determines that lid 12 is in the predetermined orientation. If the number of black pixels in area 180 exceeds the predetermined black pixel threshold, controller 118 determines that lid 12 is not in the predetermined orientation.

Figures 8, 9, 10, 11:
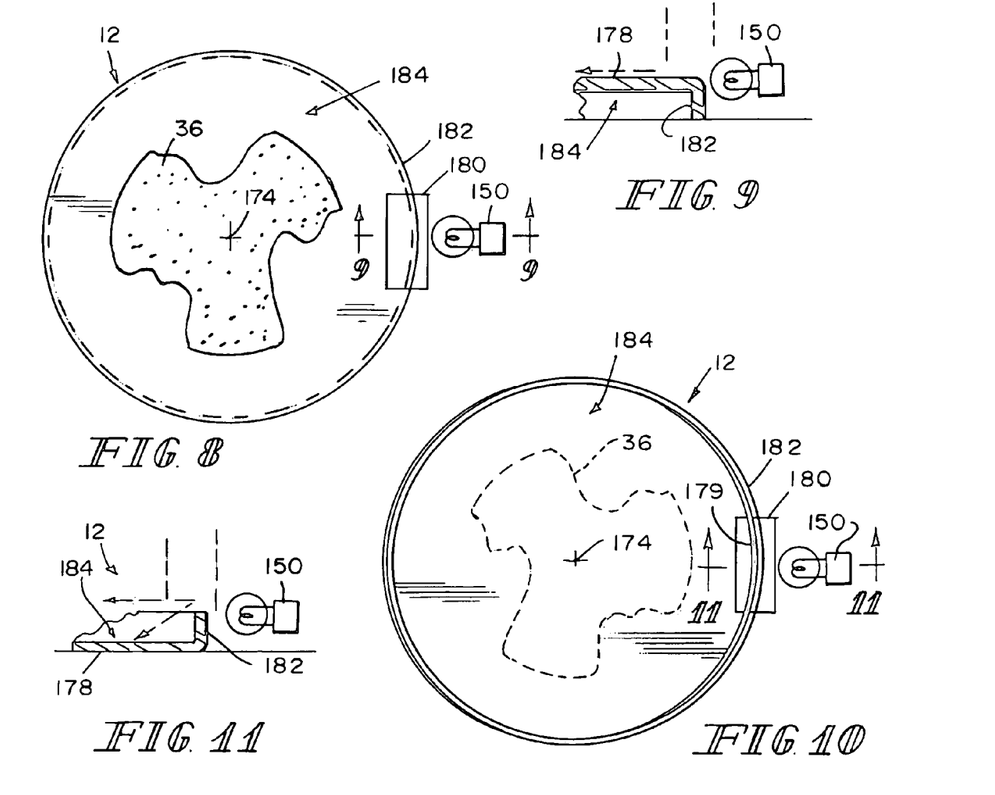
FIG. 8 is a top plan view of a lid showing evaluation of whether the printed matter is on a predetermined surface of the lid by use of a lid orientation test that determines whether the lid is in a predetermined orientation.
FIG. 9 is a sectional view taken along lines 9—9 of FIG. 8 showing application of the lid orientation test when the lid is in the predetermined orientation.
FIG. 10 is a top plan view of a lid showing application of the lid orientation test when the lid is not in the predetermined orientation.
FIG. 11 is a sectional view taken along lines 11—11 of FIG. 10.

Illustratively, lid 12 is in the predetermined orientation when surface 178 faces upwardly away from conveyor 114 and a rim 182 of lid 12 extends downwardly from a panel 184 of lid 12 toward conveyor 114 to rest on conveyor 114, as shown, for example, in FIGS. 8 and 9. Lid 12 is not in the predetermined orientation when surface 178 faces downwardly toward and engages conveyor 114 and rim 182 extends upwardly from panel 184 and away from conveyor 114, as shown, for example, in FIGS. 10 and 11.

Light source 150 is used to perform the lid orientation test. Illustratively, light source 150 is one or more ring lights, as suggested, for example, in FIGS. 8–11. It is within the scope of this disclosure to use one or more laser(s) and/or one or more infra-red light(s) to perform the lid orientation test.

Figure 12:
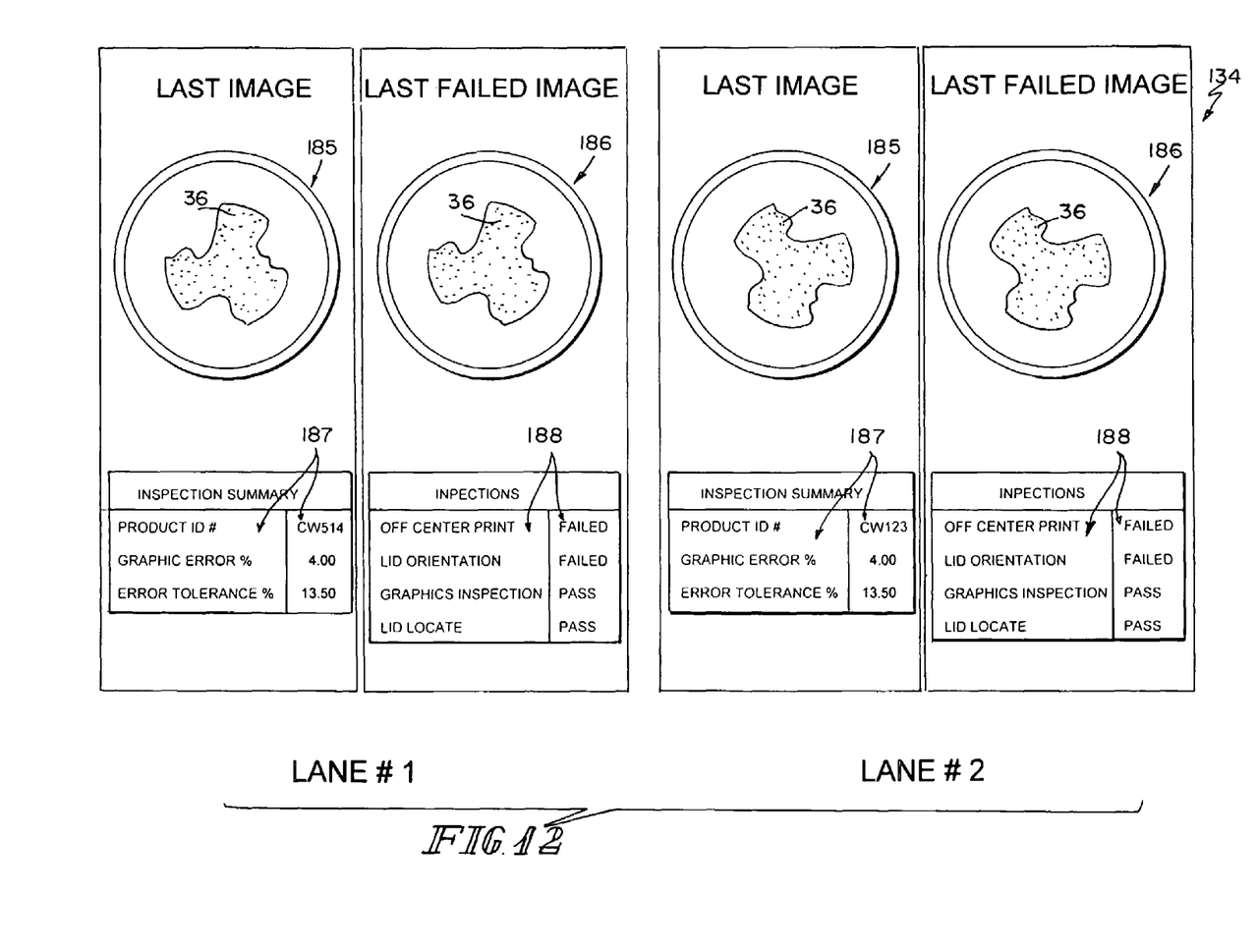
FIG. 12 is an elevational view showing display of the results of the tests performed in connection with each lid.

System 112 includes a display 134, as shown, for example, in FIG. 12. Display 134 displays images and information associated with each lane. With respect to each lane, display 134 displays the image 185 which was last sensed and the image 186 which last failed to pass any of the four tests. Regarding image 185, display 134 displays information 187 such as the product identification number of lid 12, the maximum graphic error percentage calculated among the colors of lid 12, and the error tolerance percentage associated with that maximum graphic error percentage. Regarding image 186, display 134 displays information 188 which sets forth the results of each of the four tests.

Figure 13:
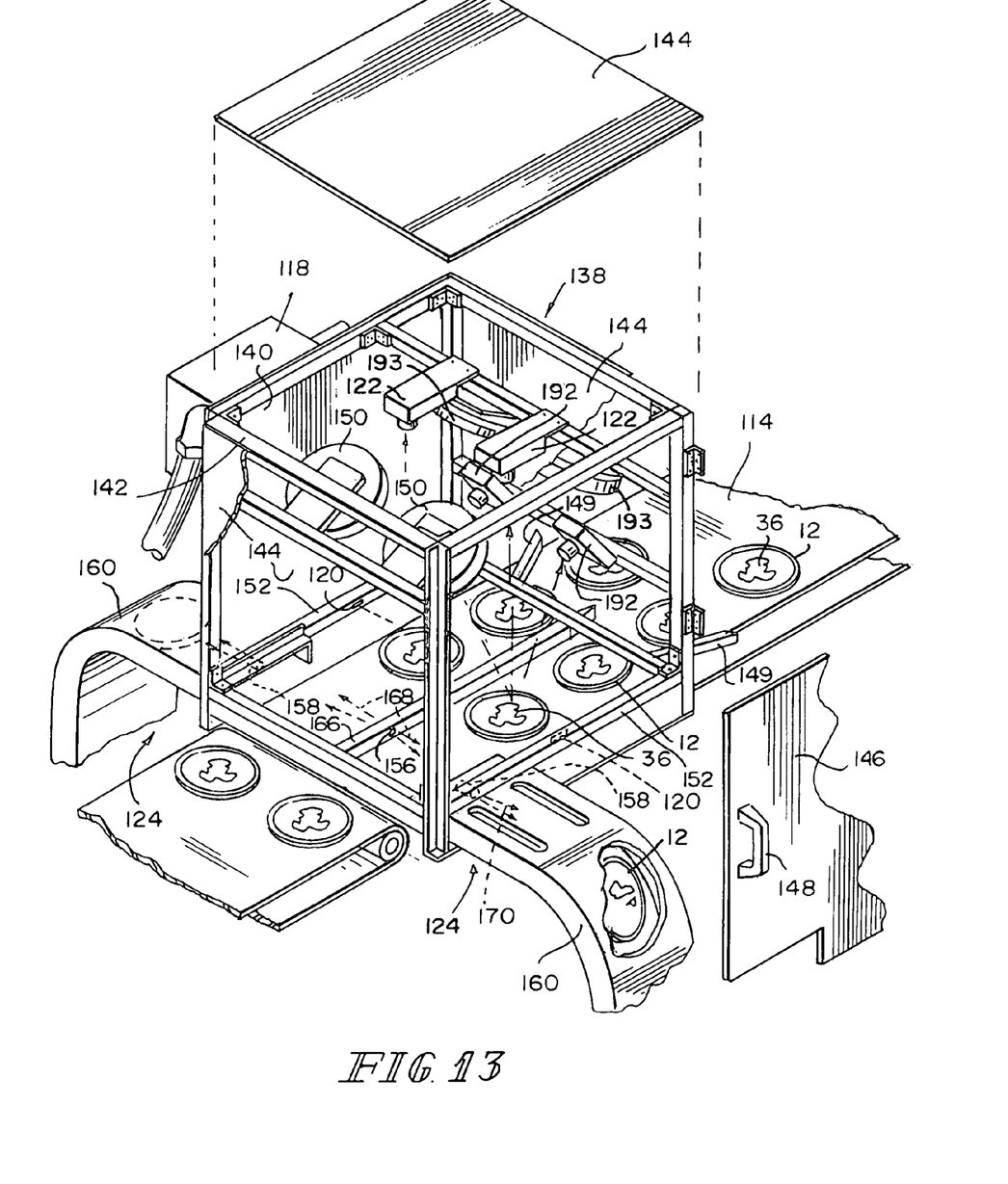
FIG. 13 is a perspective view of the dual-lane visual inspection system showing inclusion of two additional image sensors for evaluation of a feature of each lid.

In some embodiments, system 110 includes two additional image sensors 192 and two additional light sources 193, as shown, for example, in FIG. 13. Each image sensor 192 is used to sense a particular feature (e.g., a net weight statement) on lid 12 and sends an image signal representative of the image sensed to controller 118 for evaluation. Light sources 193 provides supplemental lighting for operation of sensors 192.

Figure 14:
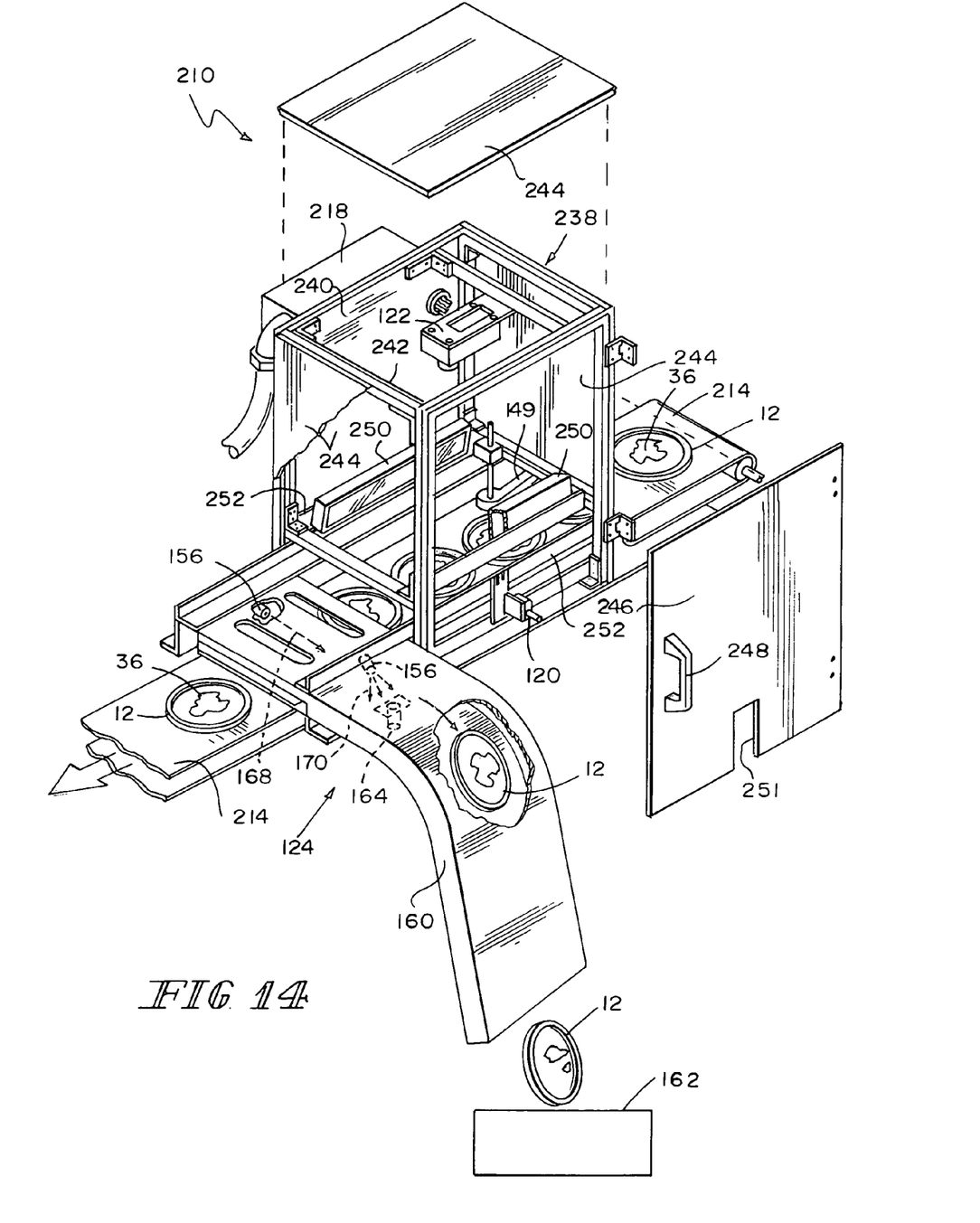
FIG. 14 is a perspective view showing a single-lane visual inspection system.
Figure 15:
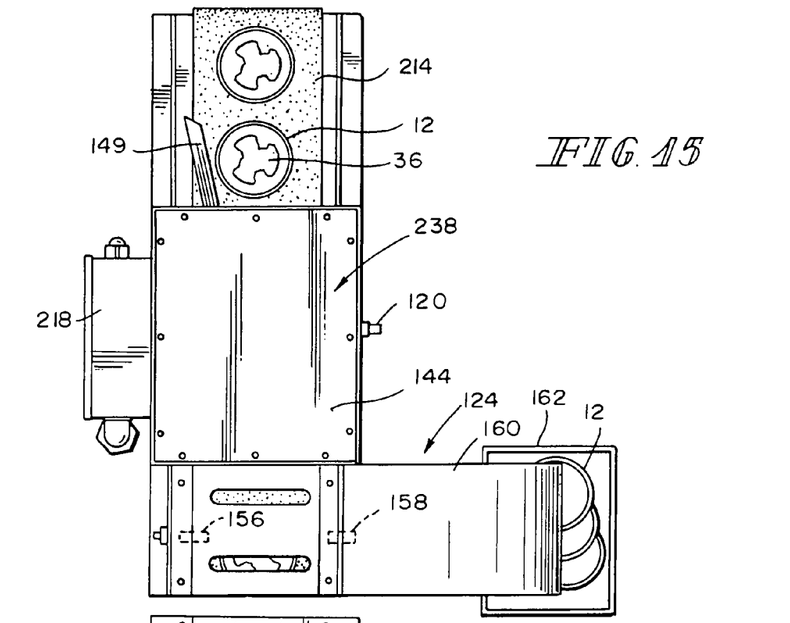
FIG. 15 is a top plan view of the single-lane visual inspection system.
Figure 16:
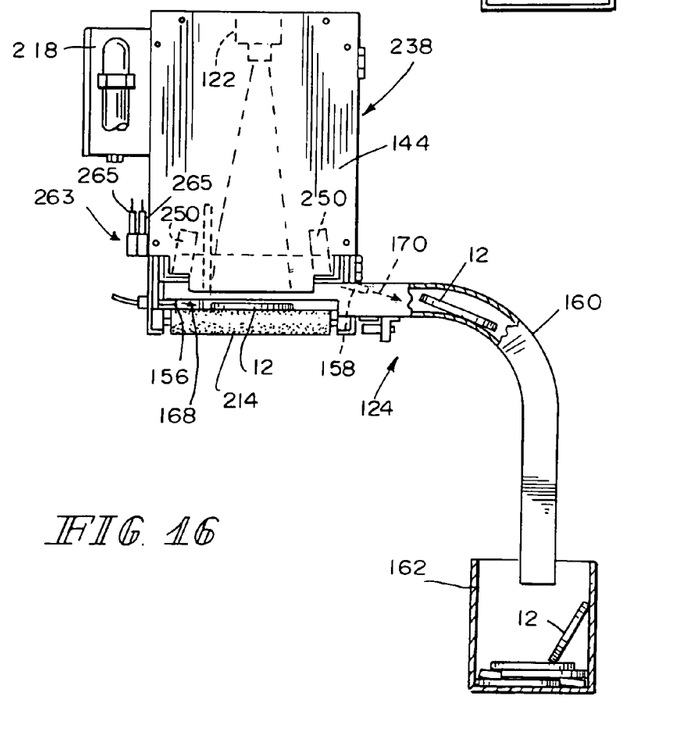
FIG. 16 is a front elevational view, with portions broken away, of the single-lane visual inspection system.

A single-lane visual inspection system 210 shown, for example, in FIGS. 14–16, is another example of visual inspection system 10. System 210 is configured to inspect printed matter 36 on lids 12 which are arranged in a single lane on a conveyor 214. The components of system 210 are similar to components of system 110 so that identical reference numbers refer to similar components.

Differences from system 110 relate primarily to modifications for accommodating a single lane of lids 12. For example, system 210 includes a single lid detector 120, a single image sensor 122, and a single lid rejector 124. A controller 218 is coupled to detector 120, sensor 122, and rejector 124 and is configured to evaluate image signals associated with a single lane of lids 12 using the same four tests discussed above. An enclosure 238 is configured for one lane of lids 12 and includes a frame 242, panels 244 coupled to frame 242, a hinged access door 246, and a handle 248 coupled to door 246. A notch 251 formed in door 246 is configured to receive lid detector 120 when door 246 is closed. Light sources 250 are mounted along side rails 252 and, illustratively, are configured as light bars.

A valve assembly 263 shown, for example, in FIG. 16, is used to control pulses of air through nozzles 156, 158. Valve assembly 262 includes two solenoid valves 265, one for each nozzle 156, 158.

The invention claimed is:

1. A method comprising the acts of detecting a lid that is positioned in contact with and being moved by a conveyor and generating a lid-detection signal in response to detecting the lid, sensing an image of the lid in response to the lid-detection signal and generating an image signal representative of the image in response to sensing the image, evaluating the image signal to determine whether printed matter on the lid complies with predetermined quality criteria, and if the printed matter does not comply with the predetermined criteria, generating a lid-rejection signal and removing the lid from the conveyor in response to the lid-rejection signal.

2. The method of claim 1, wherein the detecting act includes operating a photosensor to detect the lid.

3. The method of claim 1, wherein the sensing act includes operating a camera to sense the image of the lid.

4. The method of claim 1, further comprising verifying whether the lid has been removed from the conveyor.

5. A method comprising the acts of
detecting a lid that is positioned on and being moved by a conveyor and generating a lid-detection signal in response to detecting the lid,
sensing an image of the lid in response to the lid-detection signal and generating an image signal representative of the image in response to sensing the image,
evaluating the image signal to determine whether printed matter on the lid complies with predetermined criteria, and
if the printed matter does not comply with the predetermined criteria, generating a lid-rejection signal and removing the lid from the conveyor in response to the lid-rejection signal, wherein the evaluating act includes performing three tests including determining whether the color content of the printed matter complies with predetermined color criteria, determining whether the printed matter is located in a predetermined location relative to the center of the lid, and determining whether the printed matter is located on a predetermined surface of the lid and the act of generating the lid-rejection signal includes generating the lid-rejection signal if one of the color content of the printed matter does not comply with the predetermined color criteria, the printed matter is not located in the predetermined location relative to the center of the lid, and the printed matter is not located on the predetermined surface of the lid.

6. The method of claim 5, wherein the image includes a plurality of pixels and the act of determining whether the color content of the printed matter complies with predetermined color criteria includes establishing a pixel count area, counting the number of pixels of each color of a predetermined set of colors located in the pixel count area, and determining whether the number of pixels of each color of the predetermined set of colors complies with predetermined individual color criteria specific to that color.

7. The method of claim 5, wherein the image includes a plurality of pixels and the act of determining whether the printed matter is located in the predetermined location relative to the center of the lid includes establishing an imaginary linear boundary and determining whether the pixels located on the imaginary linear boundary comply with predetermined location criteria.

8. The method of claim 5, wherein the act of determining whether the printed matter is located on a predetermined surface of the lid includes determining whether a region of the image having a predetermined size and a predetermined contrast level relative to the lid is present in a predetermined area of the image.

9. The method of claim 5, further comprising displaying the image of the lid and the test results in response to the lid-rejection signal.

10. A method comprising the acts of
detecting a lid that is positioned on and being moved by a conveyor and generating a lid-detection signal in response to detecting the lid,
sensing an image of the lid in response to the lid-detection signal and generating an image signal representative of the image in response to sensing the image,
evaluating the image signal to determine whether printed matter on the lid complies with predetermined criteria, and
if the printed matter does not comply with the predetermined criteria, gene rating a lid-rejection signal and removing the lid from the conveyor in response to the lid-rejection signal, wherein the removing act includes directing a first pulse of air at the lid to move the lid from the conveyor into a chute.

11. The method of claim 10, wherein the removing act includes directing a second pulse of air at the lid to move the lid through the chute to a collection bin.

12. A method comprising the acts of
sensing an image of a lid positioned on and being moved by a conveyor and generating an image signal representative of the image in response to sensing the image and
evaluating the image signal to determine whether printed matter on the lid complies with predetermined criteria, wherein the evaluating act includes determining whether the color content of the printed matter complies with predetermined color criteria and, if the printed matter does not comply with the predetermined color criteria, further comprising generating a lid-rejection signal and removing the lid from the conveyor in response to the lid-rejection signal.

13. The method of claim 12, wherein the image includes a plurality of pixels and the act of determining whether the color content of the printed matter complies with predetermined color criteria includes establishing a pixel count area, counting the number of pixels of each color of a predetermined set of colors located in the pixel count area, and determining whether the number of pixels of each color of the predetermined set of colors complies with predetermined individual color criteria specific to that color.

14. The method of claim 13, wherein the evaluating act includes determining each predetermined individual color criteria based on the color content of the printed matter of a predetermined number of lids evaluated before the lid being evaluated.

15. The method of claim 14, wherein the act of determining each predetermined individual color criteria includes averaging the number of pixels of each color of the predetermined set of colors over the predetermined number of lids evaluated before the lid being evaluated.

16. A method comprising the acts of
sensing an image of a lid positioned on and being moved by a conveyor and generating an image signal representative of the image in response to sensing the image and
evaluating the image signal to determine whether printed matter on the lid complies with predetermined criteria, wherein the evaluating act includes determining whether the printed matter is located in a predetermined location relative to the center of the lid, and further comprising generating a lid-rejection signal if the printed matter is not located in the predetermined location and removing the lid from the conveyor in response to the lid-rejection signal.

17. The method of claim 16, wherein the image includes a plurality of pixels and the act of determining whether the printed matter is located in the predetermined location relative to the center of the lid includes establishing an imaginary linear boundary and determining whether the pixels located on the imaginary linear boundary comply with predetermined location criteria.

18. The method of claim 17, wherein the act of determining whether the pixels located on the imaginary linear boundary comply with predetermined location criteria includes categorizing each pixel located on the imaginary linear boundary as one of a printed matter pixel when the pixel represents printed matter and a non-printed matter pixel when the pixel does not represent printed matter, calculating the percentage of printed matter pixels relative to the total number of pixels located on the imaginary linear boundary, and comparing the percentage to a predetermined threshold.

19. A method comprising the acts of
sensing an image of a lid positioned on and being moved by a conveyor and generating an image signal representative of the image in response to sensing the image and
evaluating the image signal to determine whether printed matter on the lid complies with predetermined criteria wherein the evaluating act includes determining whether the printed matter is located on a predetermined surface of the lid, and further comprising generating a lid-rejection signal if the printed matter is not located on the predetermined surface and removing the lid from the conveyor in response to the lid-rejection signal.

20. The method of claim 19, wherein the act of determining whether the printed matter is located on a predetermined surface of the lid includes determining whether the lid has a predetermined orientation.

21. The method of claim 19, wherein the act of determining whether the printed matter has the predetermined orientation includes determining whether a region of the image having a predetermined size and a predetermined contrast level relative to the lid is present in a predetermined area of the image.

22. A method comprising the acts of
sensing an image of a lid positioned on and being moved by a conveyor and generating an image signal representative of the image in response to sensing the image and
evaluating the image signal to determine whether printed matter on the lid complies with predetermined criteria and further comprising removing the lid from the conveyor if the printed matter on the lid does not comply with the predetermined criteria, wherein the removing act includes directing a first pulse of air at the lid to move the lid from the conveyor into a chute, directing a second pulse of air at the lid to move the lid through the chute to a collection bin, and detecting the lid in the chute with a photosensor.

23. A method comprising the acts of
sensing a first image of each lid included in a first lane of lids positioned on and being moved by a conveyor and generating a first image signal representative of the first image in response to sensing the first image,
sensing a second image of each lid included in a second lane of lids positioned on and being moved by the conveyor and generating a second image signal representative of the second image in response to sensing the second image,
evaluating each first image signal with a controller to determine whether printed matter on each lid included in the first lane complies with predetermined criteria,
evaluating each second image signal with the controller to determine whether printed matter on each lid included in the second lane complies with predetermined criteria,
if the printed matter on any lid included in the first lane does not comply with the predetermined criteria, generating a first lid-rejection signal and removing that lid from the conveyor in response to the first lid-rejection signal, and
if the printed matter on any lid included in the second lane does not comply with the predetermined criteria, generating a second lid-rejection signal and removing that lid from the conveyor in response to the second lid-rejection signal.

24. The method of claim 23, wherein the act of sensing the first image includes operating a first camera and the act of sensing the second image includes operating a second camera.

25. The method of claim 23, further comprising operating a third camera to sense an image of a feature associated with each lid included in the first lane and operating a fourth camera to sense an image of a feature associated with each lid included in the second lane.

26. The method of claim 23, wherein the act of evaluating the first image signal includes determining whether the color content of the printed matter on each lid included in the first lane complies with predetermined color criteria and the act of evaluating the second image signal includes determining whether the color content of the printed matter on each lid included in the second lane complies with the predetermined color criteria.

27. The method of claim 23, wherein the act of evaluating the first image signal includes determining whether the printed matter on each lid included in the first lane is located in a predetermined location relative to the center of that lid and the act of evaluating the second image signal includes determining whether the printed matter on each lid included in the second lane is located in a predetermined location relative to the center of that lid.

28. The method of claim 23, wherein the act of evaluating the first image signal includes determining whether the printed matter on each lid included in the first lane is located on a predetermined surface of that lid and the act of evaluating the second image signal includes determining whether the printed matter on each lid included in the second lane is located on a predetermined surface of that lid.

29. The method of claim 23, wherein each act of rejecting a lid includes directing two pulses of air at that lid to remove that lid from the conveyor and to move that lid through a chute into a collection bin.

30. The method of claim 23, further comprising displaying each image, each image of a lid that has printed matter not compliant with the predetermined criteria, and a reason why that printed matter does not comply with the predetermined criteria.

* * * * *